(12) United States Patent
Deka

(10) Patent No.: US 10,907,890 B2
(45) Date of Patent: Feb. 2, 2021

(54) DOUBLE CABINET VACUUM INSULATED REFRIGERATOR WITH A STRUCTURAL FOAMED MULLION

(71) Applicant: WHIRLPOOL CORPORATION, Benton Harbor, MI (US)

(72) Inventor: Lakshya J. Deka, Mishawaka, IN (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 16/090,679

(22) PCT Filed: Apr. 14, 2016

(86) PCT No.: PCT/US2016/027513
§ 371 (c)(1),
(2) Date: Oct. 2, 2018

(87) PCT Pub. No.: WO2017/180126
PCT Pub. Date: Oct. 19, 2017

(65) Prior Publication Data
US 2019/0120544 A1 Apr. 25, 2019

(51) Int. Cl.
*F25D 23/06* (2006.01)
*F25D 11/02* (2006.01)
*F25D 23/02* (2006.01)

(52) U.S. Cl.
CPC ............ *F25D 23/069* (2013.01); *F25D 11/02* (2013.01); *F25D 23/025* (2013.01); *F25D 23/062* (2013.01); *F25D 23/065* (2013.01); *F25D 23/064* (2013.01); *F25D 2201/126* (2013.01); *F25D 2201/14* (2013.01); *F25D 2323/021* (2013.01); *F25D 2323/024* (2013.01); *F25D 2400/04* (2013.01); *Y02B 40/00* (2013.01)

(58) Field of Classification Search
CPC .... F25D 23/025; F25D 23/065; F25D 23/069; F25D 23/063; F25D 23/062
See application file for complete search history.

(56) References Cited

U.S. PATENT DOCUMENTS 3,769,770 A 11/1973 Deschamps et al.
3,989,329 A * 11/1976 Benford ................ F25D 23/062
312/406

(Continued)

FOREIGN PATENT DOCUMENTS

EP 1808657 7/2007
WO 2016013746 1/2016

*Primary Examiner* — Kimberley S Wright
(74) *Attorney, Agent, or Firm* — Price Heneveld LLP

(57) ABSTRACT

An insulation system for an appliance includes a first vacuum insulated structure having a first set of sidewalls that define a first refrigerating compartment, a second vacuum insulated structure having a second set of sidewalls that define a second refrigerating compartment and a medial insulation structure having a rigid perimeter wall. The rigid perimeter wall includes a front portion that defines at least one hinge support adapted to support an appliance door. The rigid perimeter wall defines an insulating cavity that is filled with an insulating material. The first vacuum insulated structure engages a first edge of the perimeter wall and the second vacuum insulated structure engages a second edge of the perimeter wall.

15 Claims, 6 Drawing Sheets

(56) References Cited

U.S. PATENT DOCUMENTS

| | | | | |
|---|---|---|---|---|
| 4,043,624 | A * | 8/1977 | Lindenschmidt | F25D 23/062 312/406 |
| 4,550,576 | A * | 11/1985 | Tate, Jr. | F25D 23/069 62/441 |
| 4,627,246 | A * | 12/1986 | Wilson | F25D 23/069 312/129 |
| 4,821,399 | A * | 4/1989 | Markley | B29C 44/18 264/46.5 |
| 4,955,676 | A * | 9/1990 | Weaver | F25D 23/069 312/236 |
| 5,018,328 | A * | 5/1991 | Cur | F16L 59/065 428/74 |
| 5,082,335 | A | 1/1992 | Cur et al. | |
| 5,713,974 | A | 2/1998 | Martin et al. | |
| 5,858,280 | A | 1/1999 | Zhang et al. | |
| 6,207,280 | B1 | 3/2001 | Atarashi et al. | |
| 6,779,357 | B1 * | 8/2004 | Fann | F25D 21/14 62/285 |
| 7,037,865 | B1 | 5/2006 | Kimberly | |
| 7,108,341 | B2 * | 9/2006 | Myers | F25D 23/066 312/352 |
| 7,293,848 | B2 * | 11/2007 | Myers | F25D 23/066 312/406 |
| 7,833,342 | B2 | 11/2010 | Sambasivan et al. | |
| 8,944,541 | B2 * | 2/2015 | Allard | F25D 23/062 312/406 |
| 9,423,171 | B2 * | 8/2016 | Betto | F25D 23/063 |
| 9,429,357 | B2 * | 8/2016 | Cha | F25D 25/02 |
| 9,441,779 | B1 * | 9/2016 | Alshourbagy | F25D 23/08 |
| 9,689,604 | B2 * | 6/2017 | Wu | B32B 37/0076 |
| 9,970,703 | B2 * | 5/2018 | Cha | F25D 23/064 |
| 10,088,220 | B2 * | 10/2018 | Alshourbagy | F25D 23/08 |
| 10,105,931 | B2 * | 10/2018 | Wu | B32B 37/10 |
| 10,598,424 | B2 * | 3/2020 | Dherde | D06F 1/00 |
| 2006/0267468 | A1 | 11/2006 | Myers | F25D 23/066 312/406 |
| 2010/0244646 | A1 | 9/2010 | Laible et al. | |
| 2010/0264782 | A1 * | 10/2010 | Betto | F25D 23/063 312/109 |
| 2012/0118318 | A1 | 5/2012 | Hillebrandt Poulsen et al. | |
| 2013/0249371 | A1 | 9/2013 | Lively et al. | |
| 2013/0305535 | A1 * | 11/2013 | Cur | F25D 23/062 29/890.035 |
| 2014/0015394 | A1 * | 1/2014 | Cha | F25D 23/063 312/404 |
| 2014/0346942 | A1 | 11/2014 | Kim et al. | |
| 2015/0241118 | A1 * | 8/2015 | Wu | B32B 17/067 428/426 |
| 2016/0102905 | A1 * | 4/2016 | Cha | F25D 23/069 312/406.1 |
| 2016/0252294 | A1 * | 9/2016 | Cha | F25D 25/02 312/407 |
| 2017/0003070 | A1 * | 1/2017 | Alshourbagy | F25D 23/08 |
| 2017/0144412 | A1 * | 5/2017 | Wu | B32B 17/067 |
| 2018/0363973 | A1 * | 12/2018 | Alshourbagy | F25D 23/08 |
| 2019/0101320 | A1 * | 4/2019 | Dherde | F25D 23/028 |

* cited by examiner

DOUBLE CABINET VACUUM INSULATED REFRIGERATOR WITH A STRUCTURAL FOAMED MULLION

FIELD OF THE DEVICE

The device is in the field of insulating structures for appliances, more specifically, a multi-component insulating structure having a structural foamed mullion.

SUMMARY

In at least one aspect, an insulation system for an appliance includes a first vacuum insulated structure having a first set of sidewalls that define a first refrigerating compartment, a second vacuum insulated structure having a second set of sidewalls that define a second refrigerating compartment and a medial insulation structure having a rigid perimeter wall. The rigid perimeter wall includes a front portion that defines at least one hinge support adapted to support an appliance door. The rigid perimeter wall defines an insulating cavity that is filled with an insulating material. The first vacuum insulated structure engages a first edge of the perimeter wall and the second vacuum insulated structure engages a second edge of the perimeter wall.

In at least another aspect, an appliance includes a first vacuum insulated structure defining a first refrigerating compartment. The first vacuum insulated structure has an injection molded first-structure trim breaker extending between a first-structure inner liner and a first-structure outer wrapper of the first vacuum insulated structure. At least one door is operable to at least partially enclose the first refrigerating compartment. An interior mullion has a medial insulation structure with a rigid perimeter wall disposed within the interior mullion. The interior mullion further defines the first refrigerating compartment. The rigid perimeter wall includes a front portion that defines at least one hinge support adapted to support the at least one door.

In at least another aspect, a method of forming an appliance includes shaping a rigid perimeter wall to define a mullion wall and upper and lower flanges that define a mullion cavity. At least one hinge support is formed within a front portion of the rigid perimeter wall. The mullion cavity is filled with an insulating material, wherein the insulating material is injected through an insulation port defined within the rigid perimeter wall. A first vacuum insulated structure is formed, wherein a vacuum insulated material is disposed between a first-structure liner and a first-structure wrapper and a first-structure trim breaker is injection molded to from a seal between the first-structure liner and the first-structure wrapper. The first vacuum insulated structure is formed on the upper flange of the rigid perimeter wall to define a first refrigerating compartment. A door is attached to the at least one hinge support, wherein structural support for the door is supplied by the rigid perimeter wall and wherein the door and the first vacuum insulated structure are each supported by the rigid perimeter wall.

These and other features, advantages, and objects of the present device will be further understood and appreciated by those skilled in the art upon studying the following specification, claims, and appended drawings.

DETAILED DESCRIPTION OF EMBODIMENTS

Figure 1:
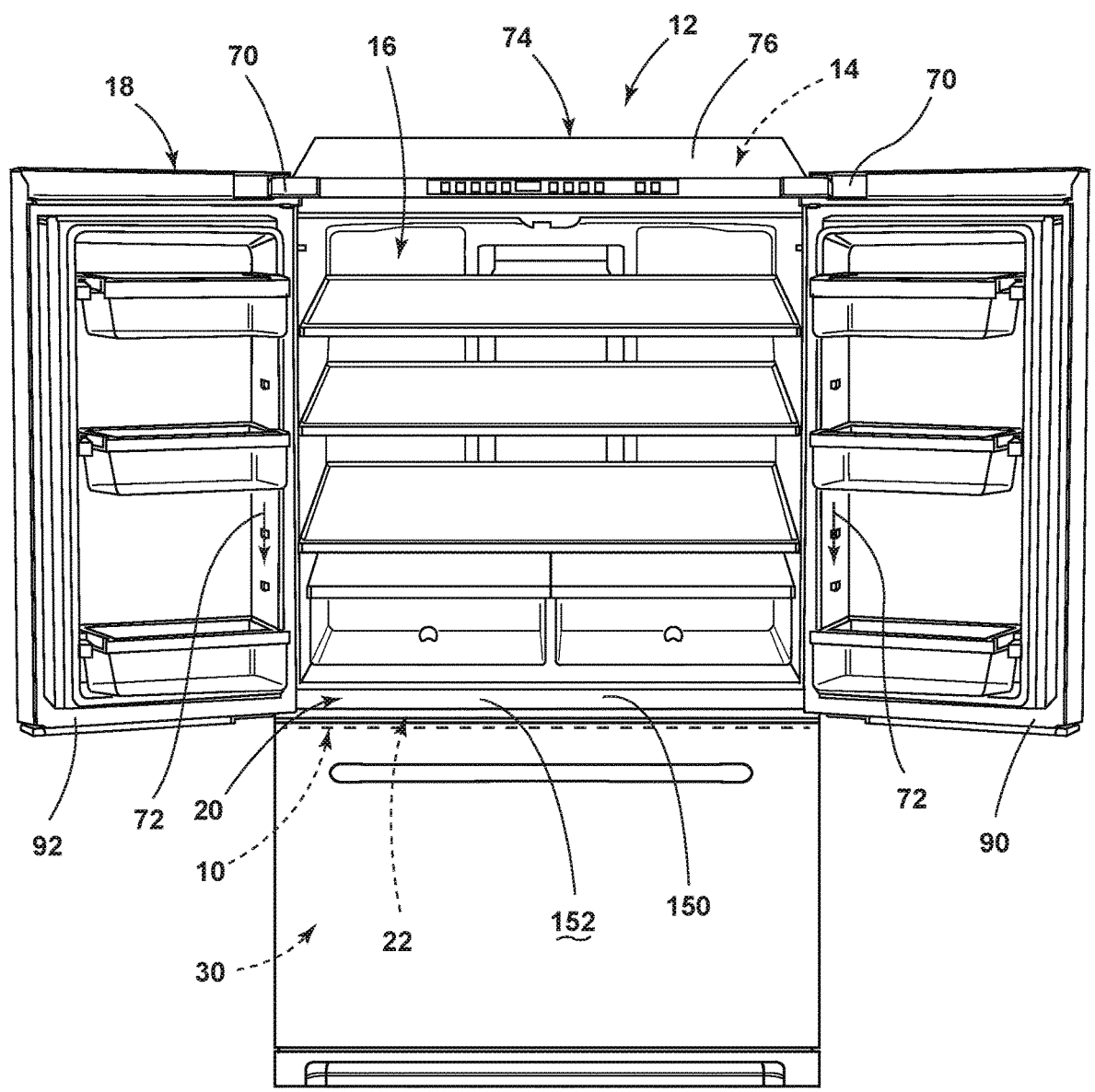
FIG. 1 is a front perspective view of a refrigerating appliance incorporating an aspect of the multi-component insulation structure.
Figure 2:
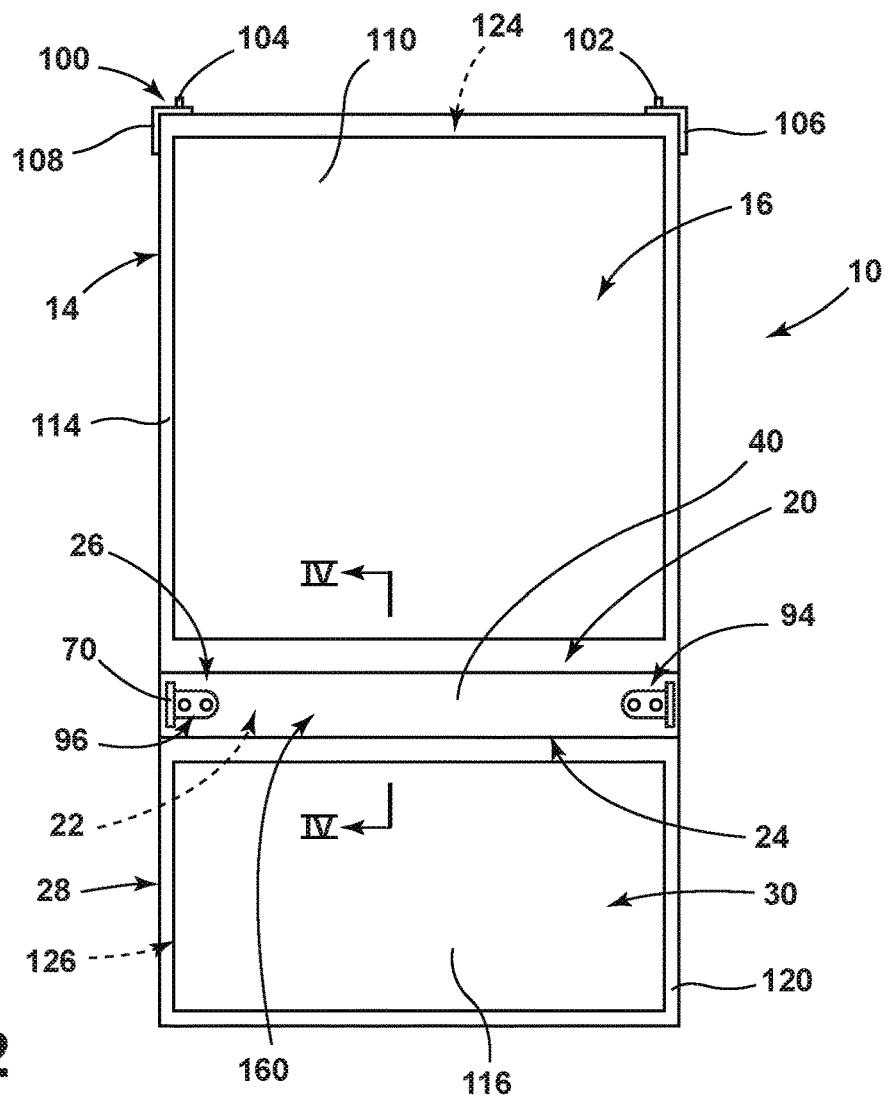
FIG. 2 is an elevational view of an aspect of the multi-component insulation structure for an appliance.
Figure 4:
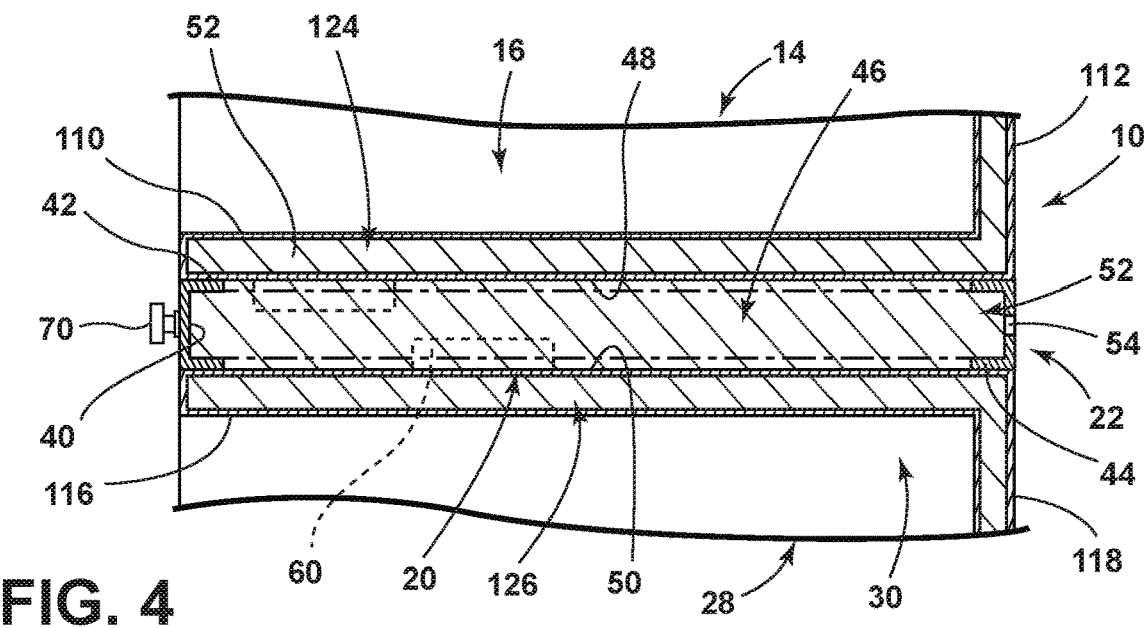
FIG. 4 is a cross-sectional view of the multi-component insulation structure of FIG. 2 taken along line IV-IV.
Figure 3:
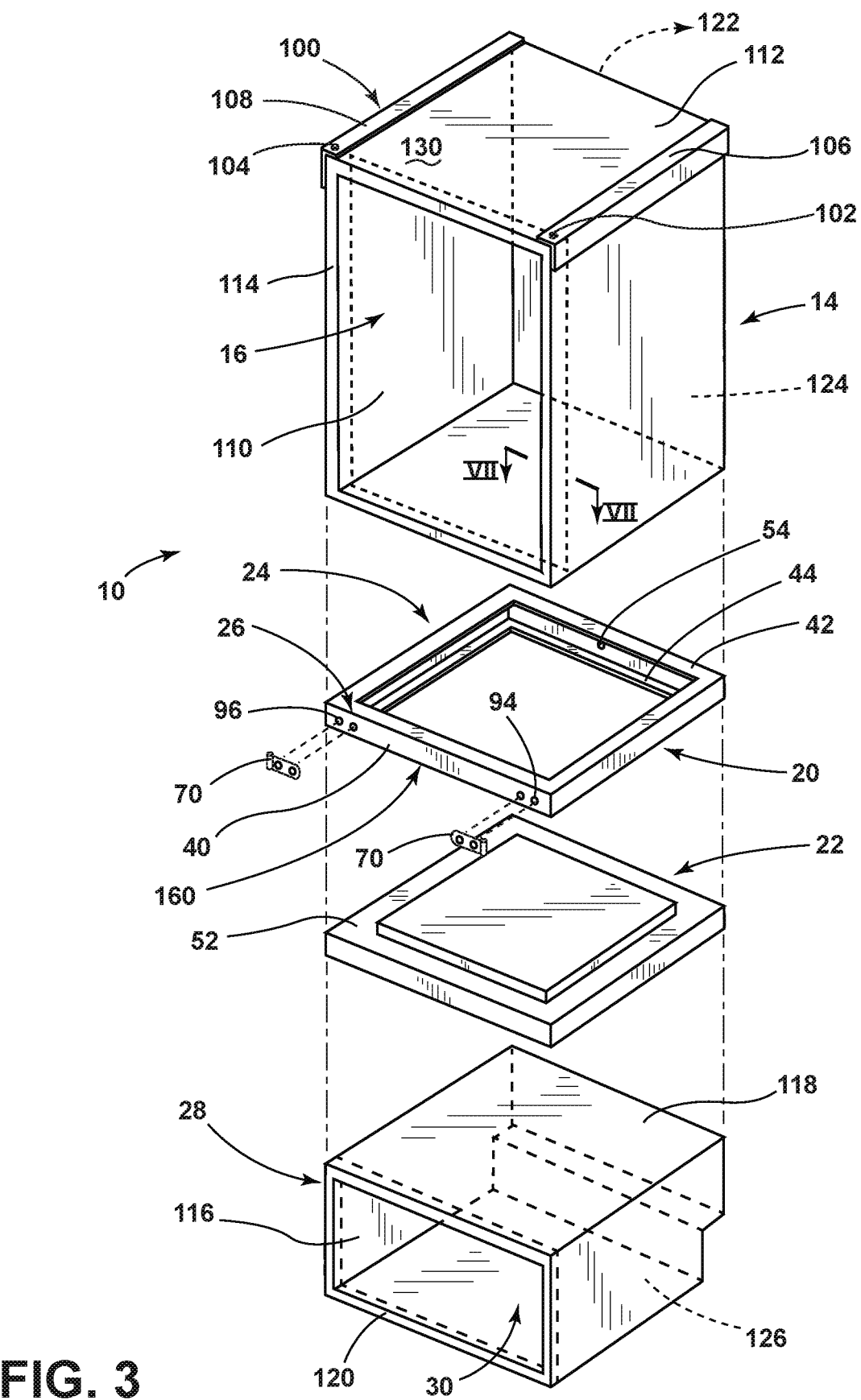
FIG. 3 is an exploded perspective view of the multi-component insulation structure of FIG. 3.
Figure 5:
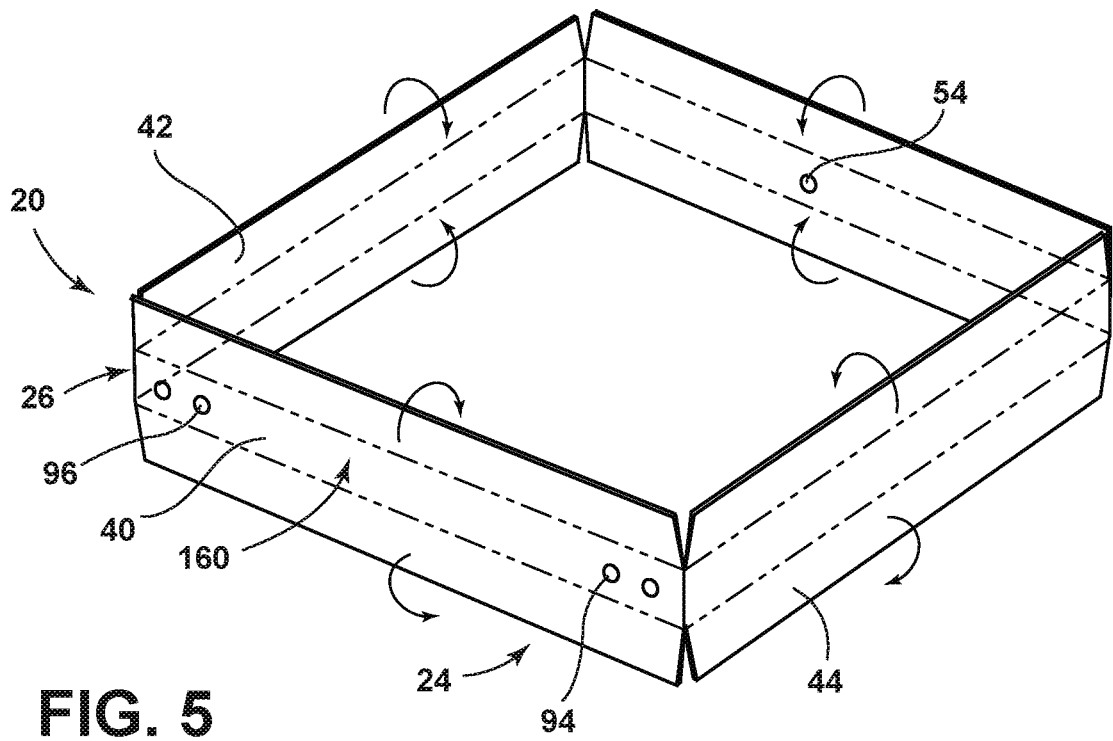
FIG. 5 is a top perspective view of an aspect of a rigid perimeter wall for a medial insulation structure of an aspect of the multi-component insulation structure, with the rigid perimeter wall in a pre-formed state.
Figure 6:
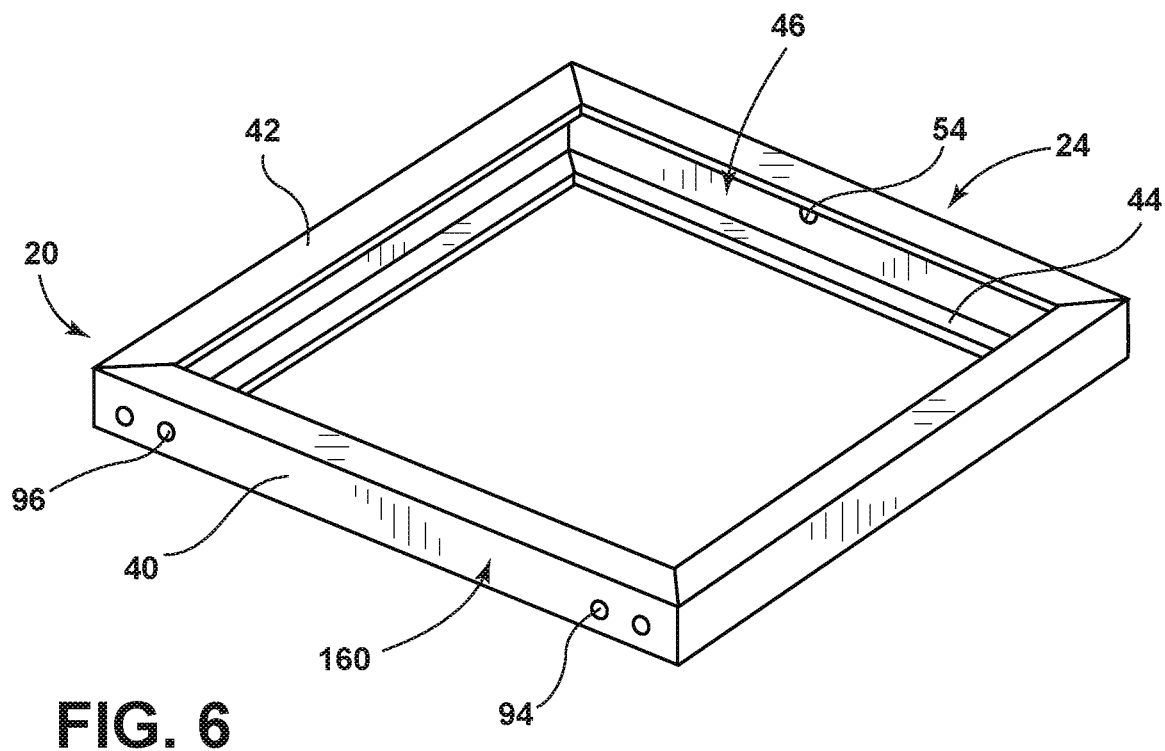
FIG. 6 is a top perspective view of the rigid perimeter wall of FIG. 5 with the rigid perimeter wall manipulated to define a mullion wall and upper and lower flanges of the rigid perimeter wall.
Figure 7:
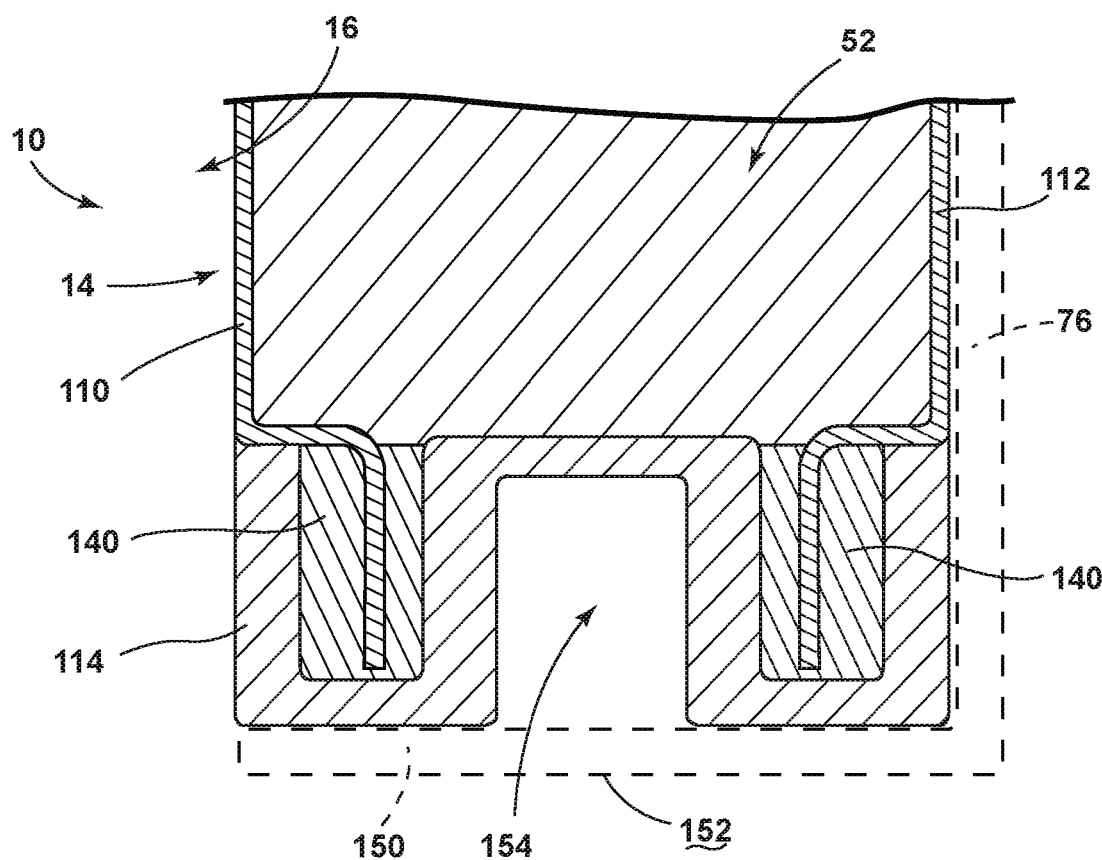
FIG. 7 is a cross-sectional view of the multi-component insulation structure of FIG. 3 taken along line VII-VII.
Figure 8:
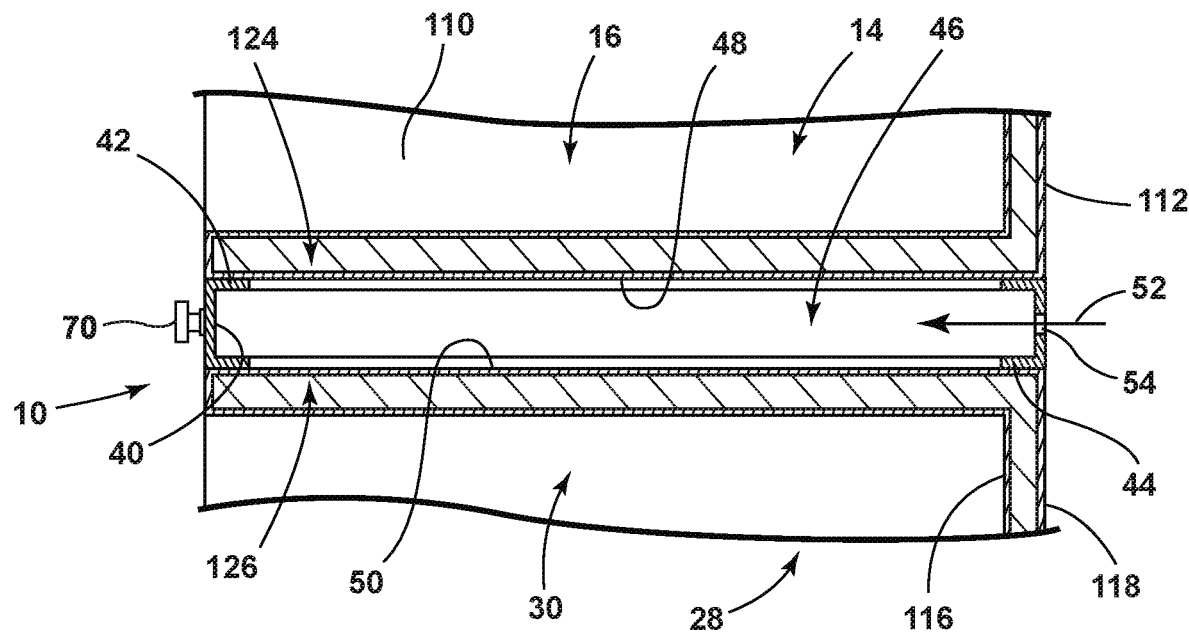
FIG. 8 is a cross-sectional view of an aspect of a multi-component insulation structure showing the installation of an insulating material within an insulating cavity formed by the rigid perimeter wall.
Figure 9:
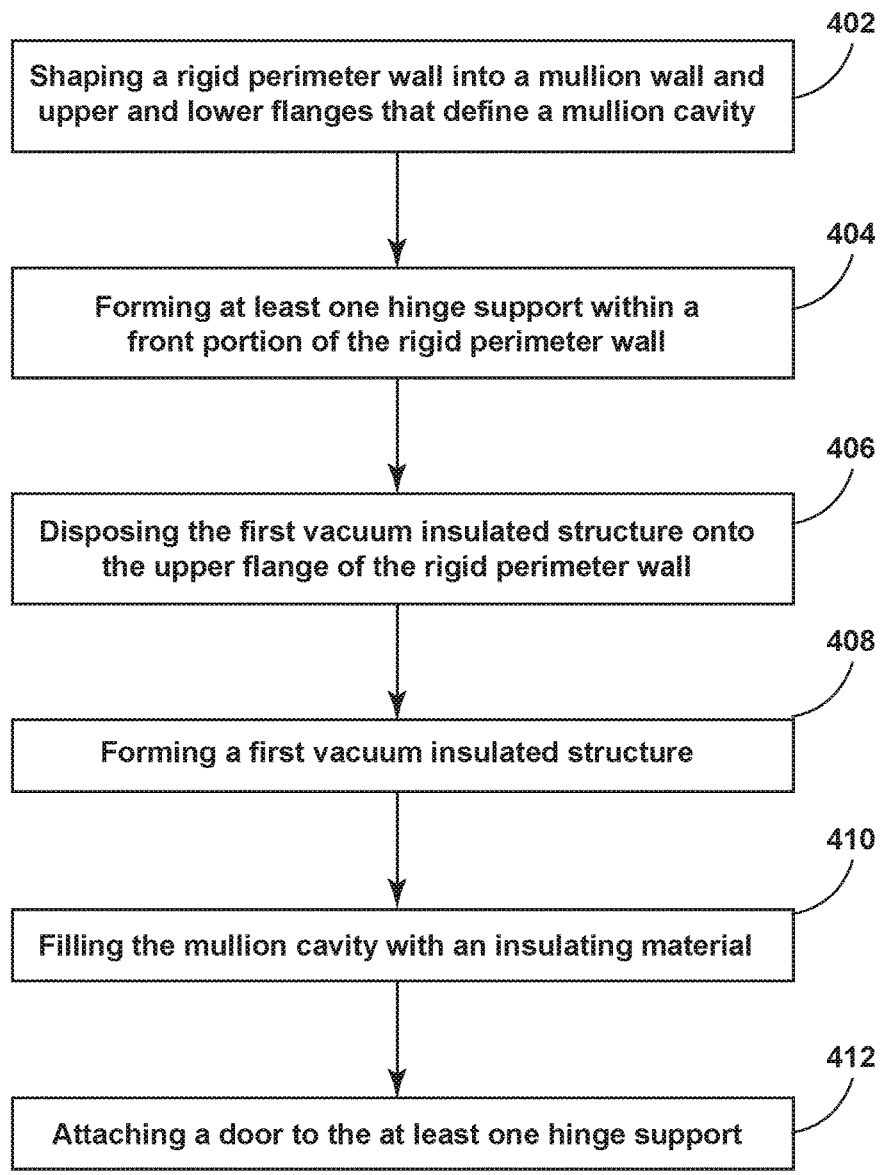
FIG. 9 is a schematic flow diagram illustrating a method for forming an appliance incorporating an aspect of the multi-component insulation structure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-4, reference numeral 10 generally refers to a multi-component insulation structure for an appliance 12. According to the various embodiments, the multi-component insulation structure 10 for the appliance 12 can include a first vacuum insulated structure 14 defining a first refrigerating compartment 16. At least one door 18 of the appliance 12 is operable to at least partially enclose the first refrigerating compartment 16. An interior mullion 20 of the appliance 12 includes a medial insulation structure 22 having a rigid perimeter wall 24 disposed within the interior mullion 20. The interior mullion 20 serves to further define the first refrigerating compartment 16. Additionally, the rigid perimeter wall 24 defines at least one hinge support 26 adapted to support the at least one door 18 of the appliance 12. According to various embodiments, the multi-component insulation structure 10 can also include a second vacuum insulated structure 28 that defines a second refrigerating compartment 30. In such an embodiment, the interior mullion 20 serves to at least partially define the second refrigerating compartment 30 and also separates the first and second refrigerating compartments 16, 30. The interior mullion 20 serves to separate the first and second vacuum insulated structures 14, 28.

Referring again to FIGS. 1-4, the rigid perimeter wall 24 includes a generally "C" type cross section that defines a mullion wall 40, an upper flange 42 and a lower flange 44. It is contemplated that the at least one hinge support 26 is defined within the mullion wall 40. Additionally, the first vacuum insulated structure 14 engages the upper flange 42 of the rigid perimeter wall 24 and the second vacuum insulated structure 28 engages the lower flange 44 of the rigid perimeter wall 24.

According to the various embodiments, the interior mullion 20 can be oriented in a horizontal configuration such that the first vacuum insulated structure 14 that defines the first refrigerating compartment 16 is positioned above and rests upon the upper flange 42 of the rigid perimeter wall 24. In turn, the lower flange 44 of the rigid perimeter wall 24 can be configured to rest upon the second vacuum insulated structure 28, such that the interior mullion 20 fully separates the first and second vacuum insulated structures 14, 28 and also provides a separation between the first and second refrigerating compartments 16, 30. It is also contemplated that the first and second refrigerating compartments 16, 30 can be positioned to the left and right of a vertically-oriented interior mullion 20.

Referring again to FIGS. 2-6, the rigid perimeter wall 24 having the mullion wall 40 and the upper and lower flanges 42, 44 can define a mullion insulating cavity 46. The mullion insulating cavity 46 can also be defined by the first and second vacuum insulated structures 14, 28, where the first vacuum insulated structure 14 defines an upper boundary 48 of the mullion insulating cavity 46 and the second vacuum insulated structure 28 defines a lower boundary 50 of the mullion insulating cavity 46 of the rigid perimeter wall 24. It is contemplated that the mullion insulating cavity 46 can be at least partially filled with an insulating material 52. Within at least a portion of the mullion wall 40, the rigid perimeter wall 24 can include an injection port 54 that extends through at least a portion of the interior mullion 20 and into the mullion insulating cavity 46. Through this injection port 54, the insulating material 52 can be blown, injected, or otherwise disposed within the mullion insulating cavity 46 and within the interior mullion 20 between the first and second vacuum insulated structures 14, 28.

According to various embodiments, it is contemplated that the insulating material 52 can be disposed through the injection port 54 after the interior mullion 20 is engaged with the first and second vacuum insulated structures 14, 28, such that the mullion insulating cavity 46 can be defined within the rigid perimeter wall 24 and between the first and second vacuum insulated structures 14, 28. It is further contemplated that the insulating material 52 can be disposed within the mullion insulating cavity 46 before the first and second vacuum insulated structures 14, 28 are assembled with the interior mullion 20. In such an embodiment, the rigid perimeter wall 24 can be disposed within a form structure that defines the upper and lower boundaries 48, 50 of the mullion insulating cavity 46 defined by the rigid perimeter wall 24. The insulating material 52 can then be injected into the mullion insulating cavity 46 to define the interior mullion 20, which can be fully or partially insulated, for assembly with the first and second vacuum insulated structures 14, 28. It is further contemplated that when the insulating material 52 is disposed within the mullion insulating cavity 46, various utility fixtures 60 can be disposed within the mullion insulating cavity 46 for use within the appliance 12. Such utility fixtures 60 can include, but are not limited to, ice dispensers, water filters, water dispensers, water tanks, water lines, electrical wiring, refrigerant lines, ductwork, conduit and/or harnesses therefor, combinations thereof, and other similar utility-related fixtures for serving the appliance 12. In such an embodiment, the one or more utility fixtures 60 can be at least partially surrounded by the insulating material 52.

Referring again to FIGS. 1-6, the hinge support 26 that is defined within the rigid perimeter wall 24 is adapted to receive at least one hinge 70 upon which a rotationally operable door 18 can be supported. With the hinge support 26 defined within the rigid perimeter wall 24, downward force 72 and/or rotational force is transferred from the door 18 to the cabinet 74 of the appliance 12 that includes the multi-component insulation structure 10 and is delivered into the rigid perimeter wall 24 of the interior mullion 20. Accordingly, various rotational and downward forces 72 exerted by the weight of the door 18 can be delivered into the interior mullion 20. These various rotational and downward forces 72 can then be transferred directly to other structural components of the door 18, such as a primary outer wrapper 76 that extends substantially over the multi-component insulation structure 10 to form the cabinet 74. Accordingly, portions of the rigid perimeter wall 24 can be attached directly to the primary outer wrapper 76. In this manner, the rotational and downward force 72 of the door 18 can be transferred through the hinge supports 26, into the rigid perimeter wall 24 and out to the primary outer wrapper 76 to be transferred to the floor. Accordingly, these downward forces 72 can be directed away from the first and second vacuum insulated structures 14, 28, to prevent such forces from bending, twisting, or otherwise deforming the first and second vacuum insulated structures 14, 28. Such deformation may result in a stretching, cracking or other damage that can cause a loss of vacuum pressure within the first and second vacuum insulated structures 14, 28, and loss of insulating capability within the multi-component insulation structure 10.

According to the various embodiments, as exemplified in FIGS. 2-6, the rigid perimeter wall 24 can be made of various rigid materials that can include, but are not limited to, metal, metal alloys, composite materials, various polymers, combinations thereof, and other similar rigid materials within which the hinge supports 26 can be defined for receiving and supporting the hinges 70 and doors 18 of the appliance 12.

Referring again to FIGS. 1-4, it is contemplated that the appliance 12 can include right and left French doors 90, 92, such as in the case of a French door bottom mount (FDBM) appliance 12. In such an embodiment, the at least one hinge support 26 can include right and left hinge supports 94, 96 disposed within the mullion wall 40 for supporting the right and left French doors 90, 92 from below. As discussed above, the placement of the hinge supports 26 within the mullion wall 40 of the rigid perimeter wall 24 serves to transfer the rotational and downward forces 72 of the right and left French doors 90, 92 into the rigid perimeter wall 24 and out to the primary outer wrapper 76 of the appliance 12. As noted above, these forces, through this configuration, are directed away from the first and second vacuum insulated structures 14, 28 to minimize the application of stresses placed upon the first and second vacuum insulated structures 14, 28.

Referring again to FIGS. 1-3, the first vacuum insulated structure 14 can include an upper rigid support 100 that is adapted to at least partially align and support a door 18 of the appliance 12. It is contemplated that the upper rigid support 100 can be positioned proximate the right and left French doors 90, 92 of the appliance 12 such that right and left upper hinge supports 102, 104 can be positioned within right and left upper rigid supports 106, 108 for supporting the right and left French doors 90, 92. As with the rigid perimeter wall 24, the right and left upper rigid supports 106, 108 can be connected to the primary outer wrapper 76 such that forces transferred from the right and left French doors 90, 92 can be directed through the right and left upper rigid supports 106, 108 and away from the first and second vacuum insulated structures 14, 28.

Referring again to FIGS. 1-7, the first vacuum insulated structure 14 can include a first-structure inner liner 110 and a first-structure outer wrapper 112. The first-structure inner liner 110 and first-structure outer wrapper 112 are coupled together at a first-structure trim breaker 114 that spans therebetween and at least partially defines a hermetic seal of the first vacuum insulated structure 14. Similarly, the second vacuum insulated structure 28 can include a second-structure inner liner 116 and a second-structure outer wrapper 118. The second-structure inner liner 116 and second-structure outer wrapper 118 are coupled together at a second-structure trim breaker 120 that spans therebetween and defines a hermetic seal at the second vacuum insulated structure 28. During the formation of the first and second vacuum insulated structures 14, 28, after the first-structure trim breaker 114 and second-structure trim breaker 120 are disposed on the first and second vacuum insulated structures 14, 28, respectively, an insulating material 52 can be disposed within each of a first and second insulating cavity 124, 126 of the respective first and second vacuum insulated structures 14, 28. After air 122 is expressed from each of the first and second insulating cavities 124, 126, and an at least partial vacuum is defined within each of the first and second insulating cavities 124, 126, the hermetic seal defined by the first-structure trim breaker 114 and second-structure trim breaker 120 substantially prevents the infiltration of air 122 into the first and second vacuum insulated structures 14, 28.

According to the various embodiments, the placement of the hinge supports 26 within the interior mullion 20 and within the right and left upper rigid supports 106, 108 serves to transfer various forces from the right and left French doors 90, 92 away from the first and second vacuum insulated structures 14, 28. According to various embodiments, the right and left upper rigid supports 106, 108 can be attached to the exterior 130 of the first-structure outer wrapper 112 such that the right and left hinge supports 94, 96 can extend upward or outward and extend through the primary outer wrapper 76 for engagement with the hinges 70 of the right and left French doors 90, 92.

Referring again to FIGS. 2-7, the first-structure trim breaker 114 of the first vacuum insulated structure 14 can be injection molded over portions of the first-structure inner liner 110 and the first-structure outer wrapper 112. According to various embodiments, during the injection molding of the first-structure trim breaker 114, a sealing material 140 can be disposed between the first-structure trim breaker 114 and the first-structure inner liner 110 and the first-structure outer wrapper 112. After being injection molded, the combination of the first-structure trim breaker 114 and the sealing material 140 defines the hermetic seal that maintains the at least partial vacuum within the first insulating cavity 124 of the first vacuum insulated structure 14. It is also contemplated that the second-structure trim breaker 120 can be injection molded over portions of the second-structure inner liner 116 and the second-structure outer wrapper 118. Again, during the injection molding of the second-structure trim breaker 120, the sealing material 140 can be disposed between the second-structure trim breaker 120 and the second-structure inner liner 116 and the second-structure outer wrapper 118 to further define the hermetic seal for maintaining the at least partial vacuum within the second insulating cavity 126 of the second vacuum insulated structure 28. According to various embodiments, the sealing material 140 can include various materials that can include, but are not limited to, glue, adhesives, silicone, rubber, and other similar sealing materials 140. It is also contemplated that the first-structure and second-structure trim breakers 114, 120 can be extruded or attached through an injection/extrusion process and disposed at the edges of the first and second vacuum insulated structures 14, 28 to at least partially define the hermetic seal described herein.

After the first-structure and second-structure trim breakers 114, 120 are injection molded on the first and second vacuum insulated structures 14, 28, respectively, the primary outer wrapper 76 can be placed over portions of the first and second vacuum insulated structures 14, 28 and in particular over portions of the first-structure and second-structure trim breakers 114, 120. In this matter, the primary outer wrapper 76 can define a contact flange 150 that conceals the first-structure and second-structure trim breakers 114, 120 and provides a contact surface 152 against which the left and right French doors 92, 90 can engage and seal against to define a closed position of the right and left French doors 92, 90. It is also contemplated that an interstitial space 154 defined proximate the first-structure and second-structure trim breakers 114, 120 can include various condensation-limiting features that can include, but are not limited to, heating elements, foamed insulation, heat loops, utility fixtures 60, combinations thereof and other similar condensation-preventing fixtures.

Referring now to FIGS. 1-9, having described various aspects of the multi-component insulation structure 10 and its incorporation within various appliances 12, a method 400 is disclosed for forming an appliance 12 that incorporates an aspect of the multi-component insulation structure 10. According to the method 400, a rigid perimeter wall 24 is shaped to define a mullion wall 40 and upper and lower flanges 42, 44 that define a mullion cavity (step 402). At least one hinge support 26 is formed within a front portion 160 of a rigid perimeter wall 24 (step 404). As discussed above, the at least one hinge support 26 is configured to support a hinge 70 and also at least one door 18 for the appliance 12, such that downward forces 72 experienced by the door 18 are not transferred into the first and second vacuum insulated structures 14, 28. The first vacuum insulated structure 14 can then be disposed on the upper flange 42 of the rigid perimeter wall 24 to define the first refrigerating compartment 16 (step 406). As discussed above, it is contemplated that a second vacuum insulated structure 28 can be disposed under the lower flange 44 of the rigid perimeter wall 24 such that the second vacuum insulated structure 28 and the interior mullion 20 can define a second refrigerating compartment 30.

Referring again to FIGS. 1-9, according to the method 400, a first vacuum insulated structure 14 is formed (step 408). An insulating material 52 can be disposed between a first-structure inner liner 110 and a first-structure outer wrapper 112. The first-structure trim breaker 114 can then be injection molded to form a seal between the first-structure inner liner 110 and the first-structure outer wrapper 112. As discussed above, at least a portion of the air 122 defined within the first insulating cavity 124 can be expressed to define at least partial vacuum to form the first vacuum insulated structure 14.

According to various aspects of the method 400, the mullion insulating cavity 46 is filled with an insulating material 52, where the insulating material 52 is injected through an insulation injection port 54 defined within a rigid perimeter wall 24 (step 410). As discussed above, the insulating material 52 can be disposed within the mullion insulating cavity 46, when the rigid perimeter wall 24 is set within a form that defines the upper and lower boundaries 48, 50 of the insulating cavity. It is also contemplated that the insulating material 52 can be injected after the first and second vacuum insulated structures 14, 28 are attached to the interior mullion 20. In this latter embodiment, the injection of the insulating material 52 can serve to at least partially adhere the first and second vacuum insulated structures 14, 28 to the rigid perimeter wall 24 to form a substantially integral configuration of the multi-component insulation structure 10. It is contemplated that after the multi-component insulation structure 10 is formed, a primary outer wrapper 76 can be disposed around the first and second vacuum insulated structures 14, 28 in the rigid perimeter wall 24 to define the cabinet 74 of the appliance 12. Additionally, during the formation of the interior mullion 20 and before the insulation material is injected through the injection port 54 of the rigid perimeter wall 24, at least one utility fixture can be disposed within the mullion insulating cavity 46, such that when the insulating material 52 is injected through the injection port 54, the insulating material 52 at least partially surrounds the various utility fixtures 60 disposed therein. After the cabinet 74 of the appliance 12 is formed, a door 18 can be attached to the at least one hinge support 26 (step 412). As discussed above, the structural support for the door 18 is supplied by the rigid perimeter wall 24 and not by the first and second vacuum insulated structures 14, 28. Accordingly, the door 18 and the first vacuum insulated structure 14 can each be supported on the rigid perimeter wall 24. It is contemplated that the rigid perimeter wall 24 can be attached directly to the primary outer wrapper 76 such that downward forces 72 and rotational forces received by the rigid perimeter wall 24 can be transferred through the primary outer wrapper 76 and to the ground such that these forces can be kept away from the first and second vacuum insulated structures 14, 28.

According to the various embodiments, the various aspects of the multi-component insulation structure 10 can be incorporated within various appliances 12 that can include, but are not limited to, refrigerators, freezers, ovens, dishwashers, laundry appliances, water heaters, various household fixtures, combinations thereof, and other similar appliances and household fixtures.

According to the various embodiments, the various insulation materials disposed within the multi-component insulation structure 10 can include, but are not limited to, an insulating foam adhesive, fumed silica, polyvinyl foam, other foam-type insulation, microspheres, nanospheres, insulating gasses, granulated insulation, combinations thereof, and other similar insulating materials 52 that can be incorporated within a vacuum insulated structure.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An insulation system for an appliance, comprising:
   a first vacuum insulated structure having a first set of sidewalls that includes a first-structure inner liner that defines a first refrigerating compartment and a first-structure outer wrapper;
   a second vacuum insulated structure having a second set of sidewalls that includes a second-structure inner wrapper that defines a second refrigerating compartment and a second-structure outer wrapper; and a medial insulation structure having a rigid perimeter wall that extends around an outer perimeter of the medial insulation structure, wherein the rigid perimeter wall includes a front portion that defines at least one hinge support adapted to support an appliance door, wherein:
the rigid perimeter wall includes a first edge and a second edge that define an insulating cavity that is filled with an insulating material, wherein the insulating material is contained within the rigid perimeter wall and between the first and second edges; and
the first vacuum insulated structure engages the first edge of the rigid perimeter wall and the second vacuum insulated structure engages the second edge of the rigid perimeter wall to separate the first-structure and second-structure inner liners and the first-structure and second-structure outer wrappers from one another.

2. The insulation system of claim 1, wherein the first vacuum insulated structure includes an upper rigid support that defines an upper hinge support adapted to at least partially support the appliance door.

3. The insulation system of claim 1, wherein the rigid perimeter wall includes a cross section defining a mullion wall, an upper flange and a lower flange, wherein the at least one hinge support is defined in the mullion wall, wherein the first vacuum insulated structure engages the upper flange and the second vacuum insulated structure engages the lower flange.

4. The insulation system of claim 2, wherein the first-structure inner liner and the first-structure outer wrapper are coupled together at a first-structure trim breaker that spans therebetween and defines a seal of the first vacuum insulated structure.

5. The insulation system of claim 4, wherein the upper rigid support is attached to the exterior of the first-structure outer wrapper.

6. The insulation system of claim 4, wherein the second-structure inner liner and the second-structure outer wrapper are coupled together at a second-structure trim breaker that spans therebetween and defines a seal of the second vacuum insulated structure.

7. The insulation system of claim 1, wherein the rigid perimeter wall includes an insulation port through which the insulating material is disposed within the insulating cavity.

8. The insulation system of claim 7, wherein the insulating material is a foam-type injected insulation.

9. The insulation system of claim 6, wherein the first-structure and second-structure trim breakers are injection molded members that form hermetic seals of the first and second vacuum insulated structures, respectively.

10. An appliance comprising:
a first vacuum insulated structure defining a first refrigerating compartment, the first vacuum insulated structure having an injection molded first-structure trim breaker extending between a first-structure inner liner and a first-structure outer wrapper of the first vacuum insulated structure;
at least one door that is operable to at least partially enclose the first refrigerating compartment; and
an interior mullion having a medial insulation structure with a rigid perimeter wall, wherein:
the interior mullion further defines the first refrigerating compartment;
the rigid perimeter wall is a continuous perimeter wall that defines a metallic outer frame of the interior mullion, the rigid perimeter wall including a front portion that defines at least one hinge support adapted to support the at least one door;
upper and lower flanges extend from the rigid perimeter wall to define an insulating cavity that is at least partially filled with an insulating material; and
the first-structure outer wrapper abuts the upper flange of the rigid perimeter wall and remains separated from the lower flange.

11. The appliance of claim 10, further comprising:
a second vacuum insulated structure defining a second refrigerating compartment, the second vacuum insulated structure having an injection molded second-structure trim breaker extending between a second-structure inner liner and a second-structure outer wrapper of the second vacuum insulated structure, wherein the interior mullion at least partially defines the second refrigerating compartment, and wherein the second structure outer wrapper abuts the lower flange of the rigid perimeter wall and remains separated from the upper flange, and wherein the rigid perimeter wall separates the first and second refrigerating compartments, wherein the interior mullion entirely separates the first and second vacuum insulated structures and the respective outer wrappers of the first and second vacuum insulated structures.

12. The appliance of claim 10, wherein the rigid perimeter wall includes a mullion wall and an upper flange that engages the first vacuum insulated structure.

13. The appliance of claim 11, wherein the rigid perimeter wall includes a lower flange that engages the second vacuum insulated structure.

14. The appliance of claim 10, wherein the at least one door includes right and left French doors, and wherein the at least one hinge support includes right and left hinge supports that support the right and left French doors, respectively.

15. The appliance of claim 10, wherein the first vacuum insulated structure includes an upper rigid support that defines an upper hinge support adapted to at least partially support the at least one door.

\* \* \* \* \*